United States Patent
Ewaschuk (12) 
(10) Patent No.: US 6,540,472 B2
(45) Date of Patent: Apr. 1, 2003

(54) WORK SUPPORT SYSTEM AND METHOD OF INVERTING A WORKPIECE

(76) Inventor: William John Ewaschuk, 61 Martindale Road, Scarborough, Ontario (CA), M1M 2B9

( * ) Notice: Subject to any disclaimer, the term of this patent is extended or adjusted under 35 U.S.C. 154(b) by 0 days.

(21) Appl. No.: 09/789,563

(22) Filed: Feb. 22, 2001

(65) Prior Publication Data

US 2001/0022931 A1 Sep. 20, 2001

(30) Foreign Application Priority Data

Mar. 13, 2000 (CA) .............................................. 2300485

(51) Int. Cl.⁷ .............................................. B65G 47/24
(52) U.S. Cl. ...................... 414/771; 414/759; 414/774; 414/775; 414/768
(58) Field of Search ................................ 414/771, 759, 414/760, 768, 769, 773, 774, 775, 781

(56) References Cited

U.S. PATENT DOCUMENTS

| 3,487,953 | A | * | 1/1970 | Wolf ............................ 414/759 |
| 3,536,206 | A | * | 10/1970 | Ruddick ....................... 414/760 |
| 3,589,532 | A | * | 6/1971 | Filkins ......................... 414/759 |
| 3,862,749 | A | * | 1/1975 | Fieser et al. ................. 414/771 |
| 3,937,381 | A | * | 2/1976 | Lang et al. ................... 414/774 |
| 3,954,170 | A | * | 5/1976 | Schlough ..................... 414/760 |
| 3,982,750 | A | * | 9/1976 | Pulda .......................... 414/774 |
| 4,008,890 | A | * | 2/1977 | Pulda .......................... 414/774 |
| 4,220,239 | A | * | 9/1980 | Prichard ...................... 414/760 |
| 4,533,291 | A | * | 8/1985 | Nishida ....................... 414/771 |
| 5,006,037 | A | * | 4/1991 | Bluemle ....................... 414/771 |
| 5,125,495 | A | * | 6/1992 | Ganzberger et al. ......... 414/771 |

FOREIGN PATENT DOCUMENTS

| FR | 002618707 A1 | * | 2/1989 | ................. 414/760 |
| GB | 2099345 A | * | 12/1982 | ................. 414/759 |
| JP | 355130402 A | * | 10/1980 | ................. 414/759 |
| JP | 402198739 A | * | 8/1990 | ................. 414/760 |

* cited by examiner

*Primary Examiner*—Kathy Matecki
*Assistant Examiner*—Sang Kim
(74) *Attorney, Agent, or Firm*—Dimock Stratton Clarizio; Mark B. Eisen (57) ABSTRACT

A work support which assists in the inversion of a large workpiece has a supporting frame and a top frame. The top frame is provided with an intermediate hinge and an end hinge along at least one end, so as to be collapsible, and the leg of the supporting frame is hinged along the opposite end. The workpiece can be moved to one side of the intermediate hinge and the top frame can be collapsed, lowering the centre of gravity of the workpiece and standing it partially on edge. One or two workers can then easily shift the workpiece over to the other side of the top frame. When the top frame is raised back to a horizontal position the work surface is in an inverted condition, exposing unfinished surfaces for finishing. In the preferred embodiment the top frame is provided with a flexible membrane overlaying the intermediate hinge. When the top frame is collapsed the membrane curls upwardly and forms a cushion which supports the edge of the workpiece, and thus assists in the inversion process. In the preferred embodiment the collapsing and raising of the top frame is assisted by an actuator such as a pneumatic piston. In a fully automatic embodiment of the invention, the work surface comprises a delivering frame and a receiving frame each respectively hingedly affixed to the top frame on opposite sides of the hinge at the intermediate portion of the top frame, which can be pivoted away from the top frame to raise and lower the workpiece. The receiving frame can be pivoted to a position just before a vertical position and the delivering frame can be pivoted to a position just past the vertical position to deliver the workpiece to the receiving frame, which is lowered back to the supporting frame with the workpiece in an inverted condition.

16 Claims, 7 Drawing Sheets

WORK SUPPORT SYSTEM AND METHOD OF INVERTING A WORKPIECE

FIELD OF INVENTION

This invention relates to work support systems. In particular, this invention relates to a work support system which assists in the inversion of a broad workpiece such as a table top or desk top.

BACKGROUND OF THE INVENTION

In the manufacture of tables, desks and other types of furniture having a broad work surface, the work surface is typically finished separately before assembly of the furniture. For example, in the case of a boardroom table or desk, the table top or desk top may comprise a core of particle board or similarly inexpensive supporting material, finished with an aesthetically appealing veneer adhered to the top face and around the edges of the core.

In order to properly finish such a workpiece the veneer must be applied to the top face, and the work surface must then be inverted to properly finish the edges and the bottom face of the workpiece. In the case of a solid wood table top, desk top or the like, the top face of the work surface must be finished by sanding, staining and/or lacquering, and then the work surface must be inverted for finishing the bottom face and the edges.

Due to its weight and bulk, the inversion of a large workpiece is difficult and can require the coordinated efforts of a number of workers. It is difficult to ensure that all workers are cooperating efficiently in this process, and in cases where less than the optimal number of workers are available to invert the workpiece there is a tendency for the workers present to attempt to invert the workpiece anyway, to maximize productivity. In either case injury to a worker during the inverting process is a serious risk. If the workpiece is mishandled or accidentally dropped during the inverting process, injury to the workers and/or damage to the workpiece itself may result.

It would accordingly be advantageous to provide a work support capable of supporting a broad workpiece for finishing, which assists in the inversion of the workpiece so that initially unexposed surfaces of the workpiece can be finished without the workpiece having to be manually lifted off of the work support and thereby risking damage to the workpiece and/or injury to the workers.

The present invention provides a work support which assists in the inversion of a large workpiece. The work support according to the invention comprises a stand having a supporting frame and a top frame. The top frame is provided with an intermediate hinge along an intermediate portion and an end hinge along at least one end, so as to be collapsible, and the leg of the supporting frame is hinged along the opposite end. Thus, after exposed surfaces of the workpiece are finished, the workpiece can be moved to one side of the intermediate hinge and the top frame can be collapsed, lowering the center of gravity of the workpiece and standing it partially on edge. One or two workers can then easily shift the workpiece over to the other side of the top frame, with the edge of the workpiece supported by the collapsed top frame. When the top frame is raised back to a horizontal position the work surface is in an inverted condition, exposing any unfinished surfaces for finishing.

In the preferred embodiment the top frame is provided with a smooth work surface on each side of the intermediate hinge and a flexible membrane overlaying the intermediate hinge, to prevent damage to the workpiece. When the top frame is collapsed the membrane curls upwardly and forms a cushion which supports the edge of the workpiece, and thus assists in the inversion process. Also, in the preferred embodiment the collapsing and raising of the top frame is assisted by an actuator, such as a pneumatic piston.

The present invention thus provides a work support system, comprising a supporting frame having at each end a leg for supporting a top frame, the top frame having a hinge at an intermediate portion of the top frame and being hinged to the supporting frame at a first end of the supporting frame, the supporting frame having a hinge at a second end opposite the first end whereby at least a portion of the leg at the second end can collapse into the supporting frame, wherein the top frame is supported in a substantially planar condition and can be collapsed along the intermediate hinge to lower an edge of a workpiece into the supporting frame for inversion of the workpiece about the lowered edge.

In further aspects of the work support system of the invention: the work support system comprises an actuator for collapsing and raising the top frame; the actuator comprises a pneumatic piston; a work surface is affixed to the top frame; a flexible member is affixed to the top frame overlying the hinge to protect the workpiece; the flexible member curls when the top frame is collapses, forming a cushion for supporting the lowered edge of the workpiece; the top frame is hinged to the supporting frame at the second end; the work surface comprises a delivering frame and a receiving frame each respectively hingedly affixed to the top frame on opposite sides of the hinge at the intermediate portion of the top frame, wherein the delivering frame and the receiving frame can be pivoted away from the top frame to raise and lower the workpiece; the receiving frame can be pivoted to a position just before a vertical position and the delivering frame can be pivoted to a position just past the vertical position to deliver the workpiece to the receiving frame; the delivering frame and the receiving frame are pivoted by respective actuators anchored to the supporting frame; and/ or the actuators comprise pneumatic cylinders.

The present invention further provides a method of inverting a workpiece supported on a work support comprising a supporting frame having legs for supporting a top frame, the top frame having a hinge at an intermediate portion of the top frame and being hinged to the supporting frame at a first end of the supporting frame, the supporting frame having a hinge at a second end opposite the first end of the supporting frame whereby at least a portion of each leg at the opposite end can collapse into the supporting frame, comprising the steps of a with the top frame supported in a substantially planar condition, positioning the workpiece on one side of the intermediate hinge, b. collapsing the top frame along the intermediate hinge to lower an edge of a workpiece into the supporting frame, c. toggling the workpiece about the lowered edge to the other side of the intermediate hinge, and d. raising the top frame to the substantially planar condition.

Further aspects of the method of the invention, in which a receiving frame and a delivering frame are respectively hingedly affixed to the top frame on opposite sides of the hinge at the intermediate portion of the top frame, comprise in step c. the substeps of: i. pivoting the receiving frame away from the top frame to a position just before a vertical position, ii. pivoting the delivering frame away from the top frame to a position just past the vertical position, to deliver the workpiece to the receiving frame, and iii. pivoting the receiving frame back to the top frame; and/or delivering the workpiece to the delivering frame using a conveyor.

BRIEF DESCRIPTION OF THE DRAWINGS

In drawings which illustrate by way of example only a preferred embodiment of the invention.

DETAILED DESCRIPTION OF THE INVENTION

A preferred embodiment of the work support system 10 is illustrated in FIGS. 1 to 6. The work support system comprises a supporting frame 20, which may be formed steel or other suitably strong tubular members, comprising legs 22, 24. The legs 22, 24 may be rectangular structures as shown, which impart lateral rigidity to the supporting structure 20, but any other suitable leg configuration may be used to support the top frame 40 as described below. Leg 22 is rigidly affixed to a first end of the bottom frame 30, as by reinforcing strut 28, preferably (but not necessarily) in a vertical orientation as shown.

The second end of the supporting frame 20 is provided with a support hinge 60 which joins the leg 24 to the bottom frame 30, so that the leg 24 can collapse into the supporting frame 20, i.e. downward toward the bottom frame 30. In the embodiment shown the support hinge 60 joins the leg 24 to the bottom frame 30 so that the entire leg 24 collapses into the supporting frame 20, however if desired the support hinge 60 may be positioned so that only a portion of the leg 24 collapses into the supporting frame 20.

The supporting frame 20 supports a top frame 40, which comprises two sections 42, 44 joined by an intermediate hinge 46. The top frame 40 is thus hinged along an intermediate portion, preferably generally centrally along its length. The top frame 40 is joined to the top of the leg 22 by an end hinge 50, and is thus able to drop down into the supporting frame 20. The top frame 40 is affixed to the leg 24 at the second end of the supporting frame 20 either rigidly or by an end hinge 52. This allows the section 42 of the top frame 40 and the leg 24 to collapse into the supporting frame 20 together, which lowers the center of gravity of the workpiece 2 and lowers an edge of the workpiece 2 to facilitate inversion about the lowered edge of the workpiece 2.

In the preferred embodiment the top frame 40 is covered by a smooth work surface to protect the workpiece 2, in the embodiment shown comprising wood panels 40a, 40b, which are affixed to the top frame 40 as by screws, bolts or other suitable fastening elements. In this embodiment a flexible membrane, for example a suitably thick rubber mat 54, is affixed to the abutting ends of the panels 40a, 40b and overlays the intermediate hinge 46, which both protects the workpiece 2 from scratching and marring by the intermediate hinge 46 and assists in inverting the workpiece 2 as described below.

In the preferred embodiment an actuator, for example pneumatic cylinder 70, is affixed to the bottom frame 30 with its piston 72 pivotally affixed to the section 42 of the top frame 40. The piston 72 is actuated to collapse and raise the top frame 40, as described below. The work support system may optionally be collapsed and raised by any other suitable type of actuator, or operated manually.

Figure 1:
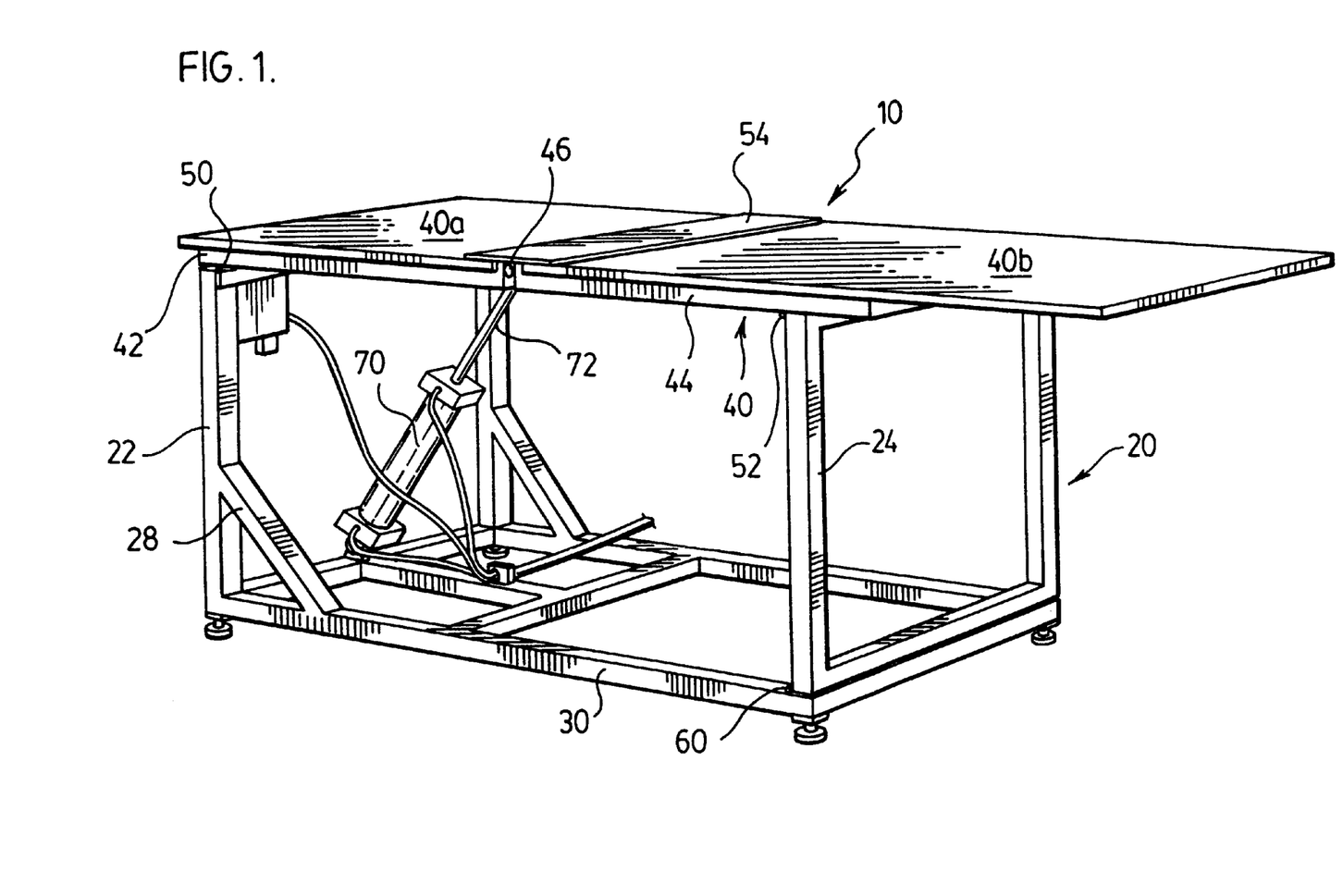
FIG. 1 is a perspective view of a work support embodying the invention.
Figure 2:
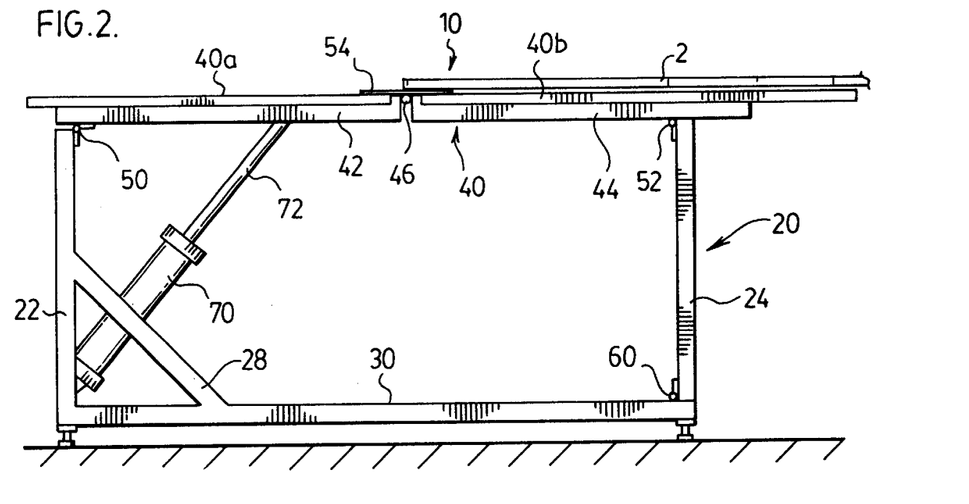
FIG. 2 is a front elevation of the work support showing a workpiece positioned for inversion.
Figure 3:
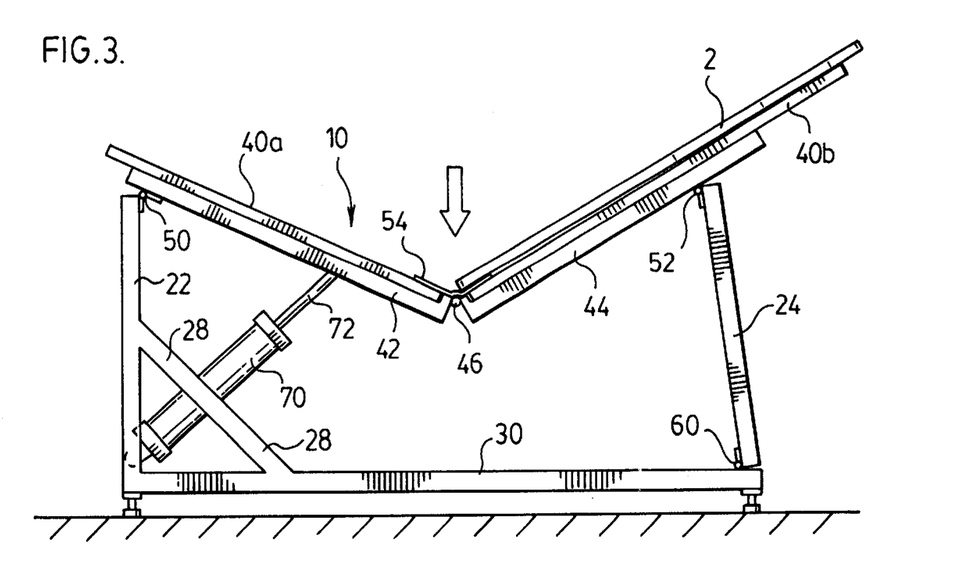
FIG. 3 is a front elevation of the work support showing the top frame in a partially collapsed condition.
Figure 4:
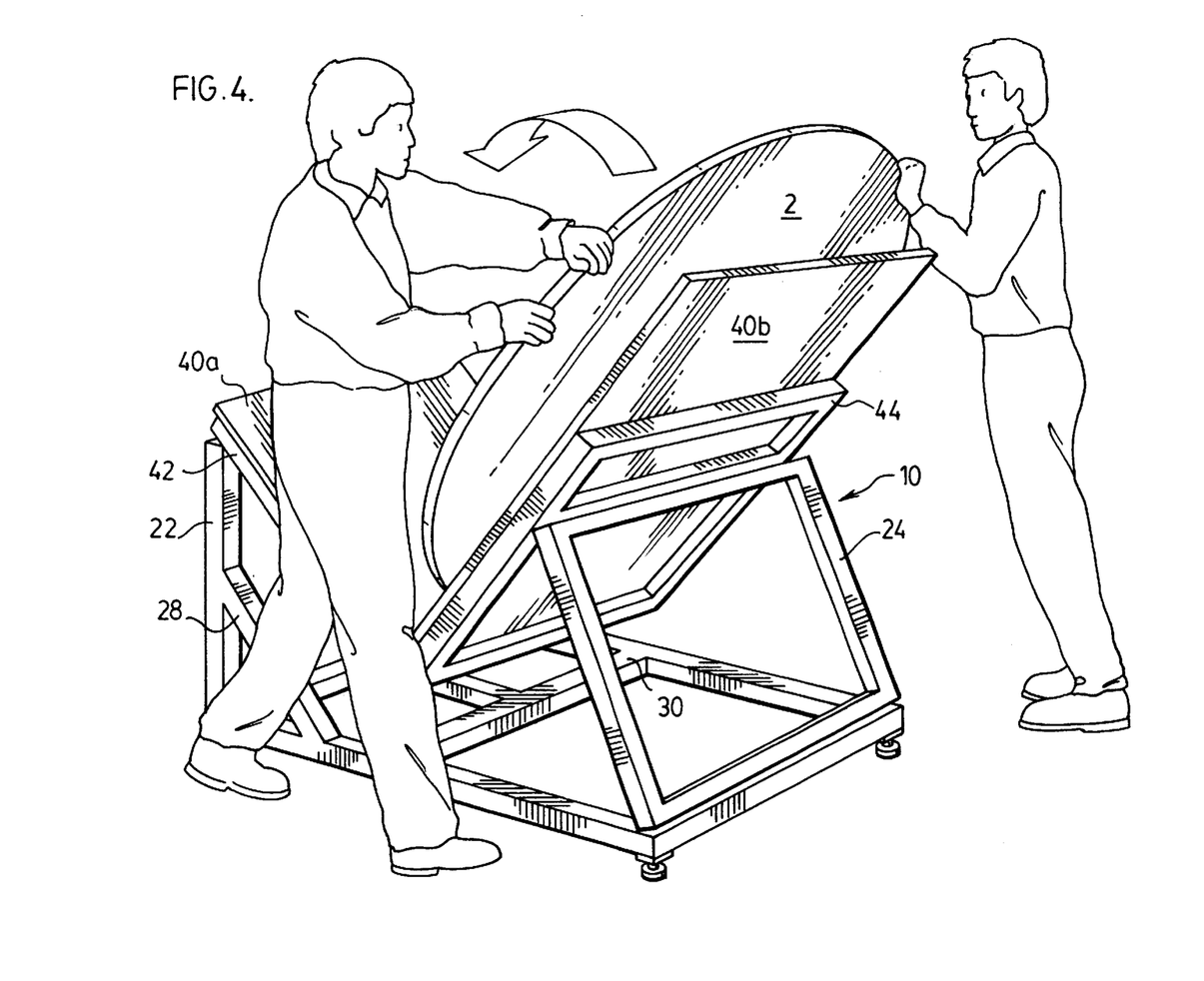
FIG. 4 is a perspective view of the work support showing the workpiece being shifted to an inverted position.

In operation, workers finish exposed surfaces of a workpiece 2. When the workpiece 2 needs to be inverted, with piston 72 fully extended and the top frame 40 thus supported with sections 42 and 44 in a substantially planar condition the workpiece 2 is positioned on one side of the intermediate hinge 46, as shown in FIG. 2. Pressure in the pneumatic cylinder 70 is released, allowing the piston 72 to retract into the cylinder 70, so that the force of gravity causes section 42 of the top frame 40 to collapse about end hinge 50, as shown in FIG. 3. At the same time, the leg 24 collapses into the supporting frame 20, so that the intermediate hinge 46 drops, and lowers with it the edge of the workpiece 2 immediately adjacent to the intermediate hinge 46. The piston 72 should be designed to arrest collapse of the top frame 40 when the sections 42, 44 of the top frame are approximately at a right angle, as shown in FIG. 4, to avoid pinching the edge of the workpiece 2.

Figure 5:
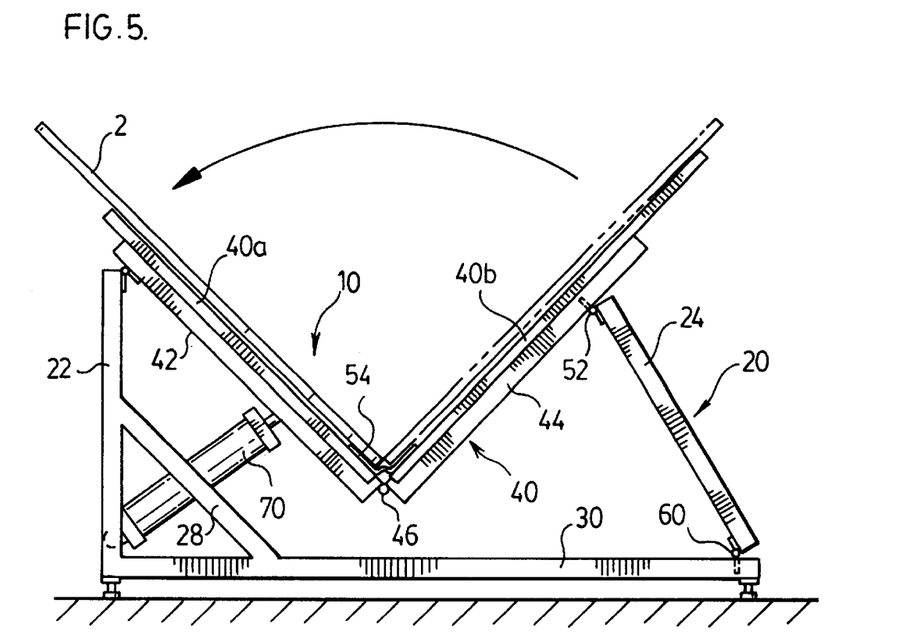
FIG. 5 is a front elevation of the work support showing the top frame in a fully collapsed condition and the workpiece shifted to an inverted position.
Figure 6:
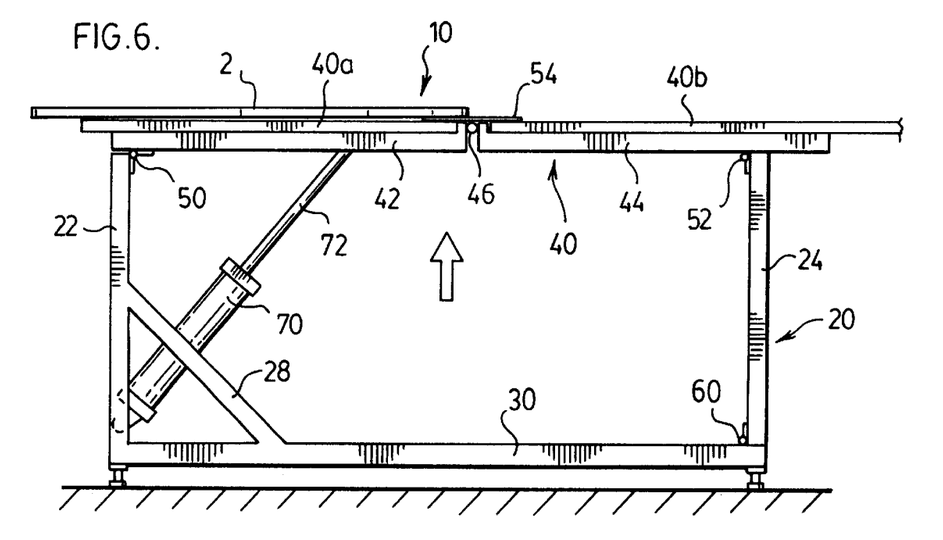
FIG. 6 is a front elevation of the work support of FIG. 1 showing top frame raised to the substantially horizontal condition with the workpiece supported in a fully inverted position.

Workers can then shift the workpiece over the lowered edge to the other side of the intermediate hinge 46, as shown in FIG. 5, thus moving the workpiece 2 to an inverted position (still at an oblique angle). This operation requires relatively little force, because in this position the center of gravity of the workpiece 2 has been lowered and the workpiece 2 has been raised substantially up on edge, which provides considerable leverage and allows one or two workers to easily shift the workpiece 2 to the inverted position as shown in FIG. 4 by inverting the workpiece 2 about its lower edge.

As can be seen in FIGS. 3 and 5, as the top frame 40 is collapsed and the angle between the top frame sections 42 and 44 decreases, the rubber mat 54 curls up forming a bubble or cushion which supports the edge of the workpiece 2. As the workers shift the workpiece 2 off of section 44, the curled mat 54 deforms toward the section 42 and helps to carry the edge of the workpiece 2 over the intermediate hinge 46 as the workpiece 2 is inverted about its lower edge.

The top frame 40 is then raised back to the to the substantially planar condition (which is generally horizontal in the embodiment shown) by actuating pneumatic cylinder 70 to extend the piston 72 to force section 42 back to the horizontal position. The workpiece 2 is now in a fully inverted position, and workers can thus finish the remainder of the workpiece 2 for assembly into furniture or the like.

It will be appreciated that the hinge 52, which is affixed to the same leg 24 as the hinge 60, is only necessary if the geometry of the supporting frame 20 will not permit the leg 24 to collapse into the frame 20 without a change in the angle between the top frame section 44 and the leg 24. As can be seen from FIG. 5, this angle may change very slightly as the top frame 40 is collapsed, so in general it would be preferable to include the hinge 52 so as not to limit the configuration of the system.

Figure 7:
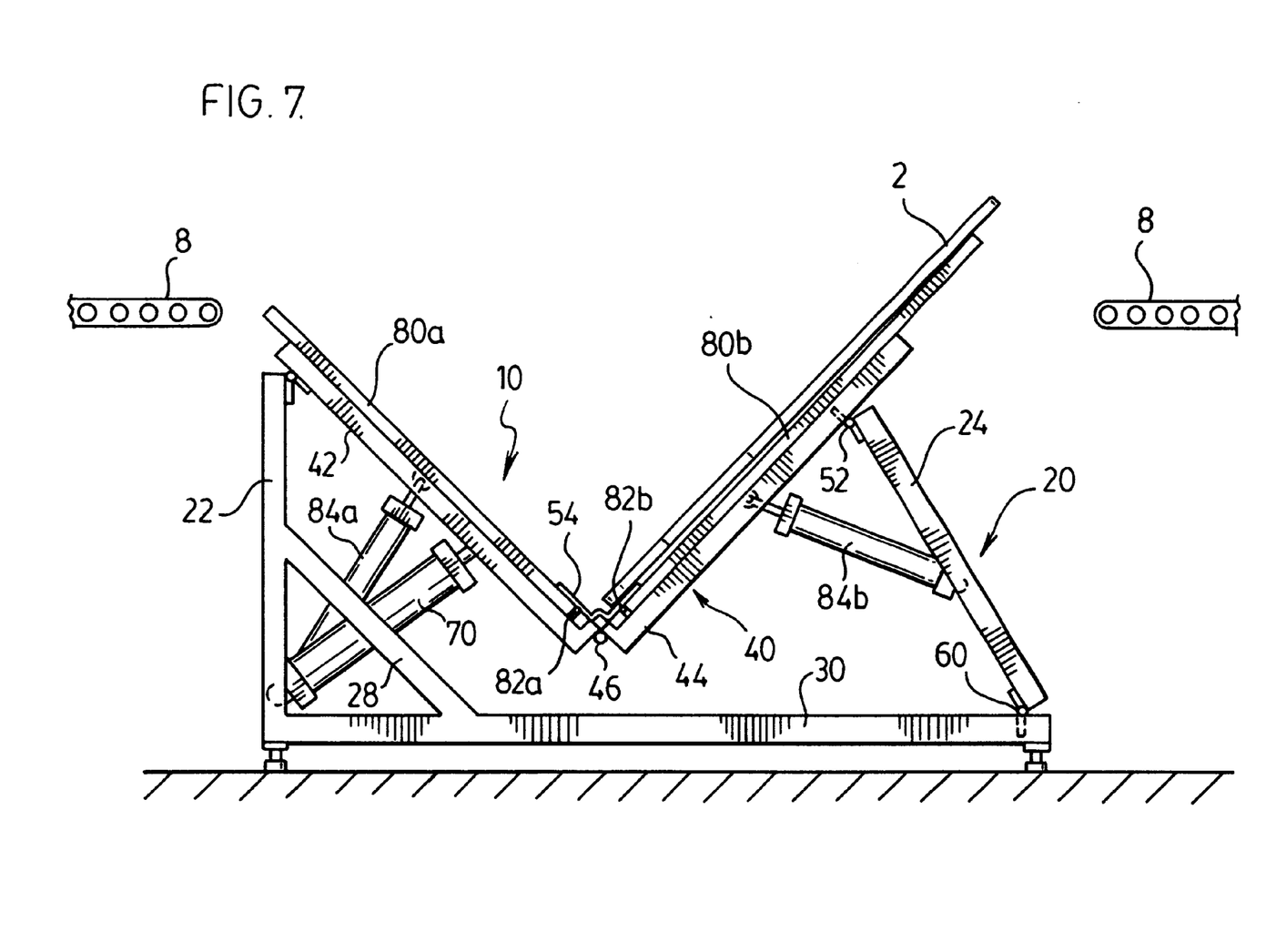
FIG. 7 is a front elevation of a fully automatic embodiment of the work support showing the top frame in the collapsed condition before inversion of the workpiece.
Figure 8:
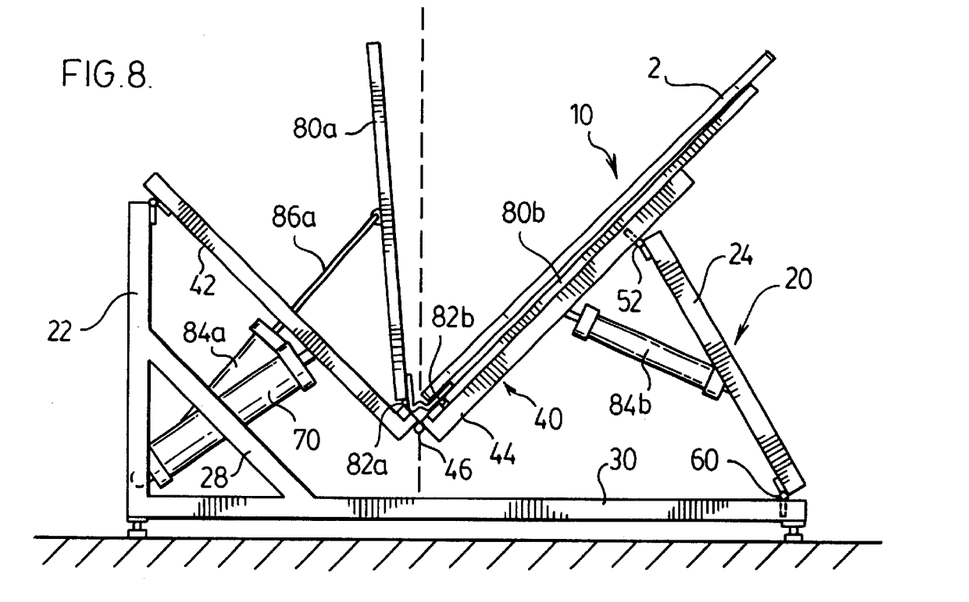
FIG. 8 is a front elevation of a the embodiment of FIG. 7 showing the receiving frame raised to a position just before the vertical.

FIGS. 7 to 10 illustrate a fully automated embodiment of the work support of the invention, adapted for example for use "in line" in a conveyor system 8 (shown in FIG. 7). In this embodiment the top panels are replaced with a movable receiving frame 80*a* and a movable delivering frame 80*b*, each preferably made of metal or including a metal subframe to prevent warping, and optionally supporting a wood panel (not shown) where a softer supporting surface is desired. The receiving frame 80*a* is hinged to the frame section 42 as at 82*a* and the delivering frame 80*b* is hinged to the frame section 44 as at 82*b*. Thus, in addition to the collapsing action of the frame 40 as described above, the receiving and delivering frames 80*a*, 80*b* are adapted to pivot away from the respective frame sections 42, 44.

The receiving frame 80*a* is actuated to pivot away from frame section 42 by an actuator, for example a pneumatic cylinder 84*a* pivotably anchored to the leg 22, and the receiving frame 80*b* is actuated to pivot away from frame section 44 by an actuator, for example a pneumatic cylinder 84*b* pivotably anchored to the leg 24. The respective pistons 86*a*, 86*b* are likewise respectively affixed to the receiving frame 80*a* and the delivering frame 80*b*.

Figure 9:
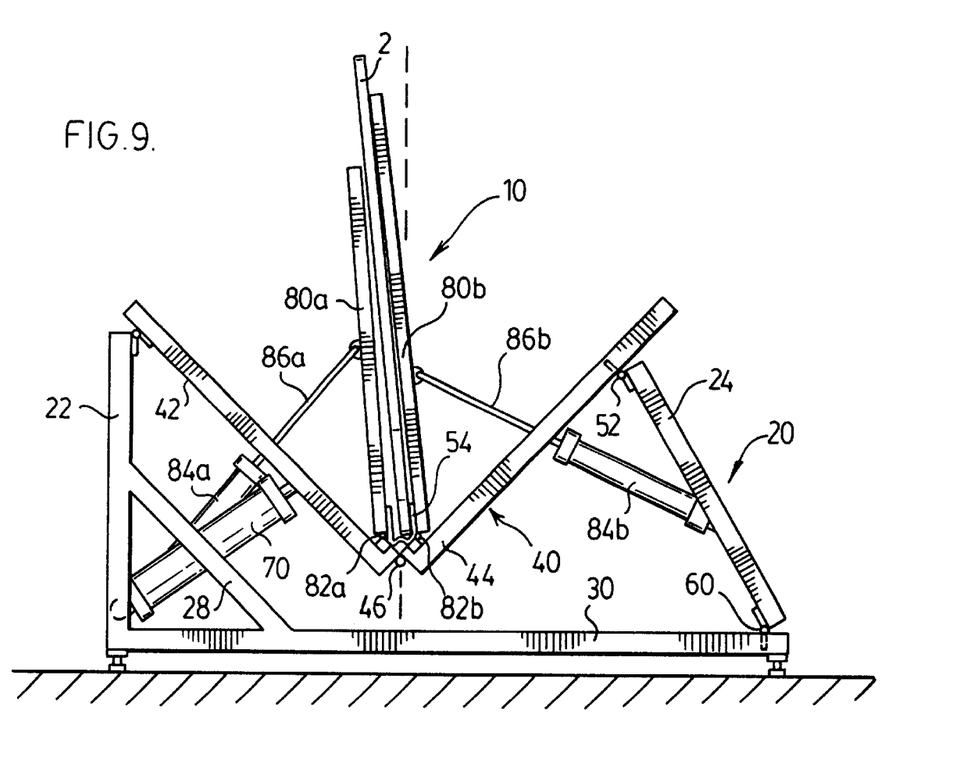
FIG. 9 is a front elevation of a the embodiment of FIG. 7 showing the delivering frame delivering the workpiece to the receiving frame.
Figure 10:
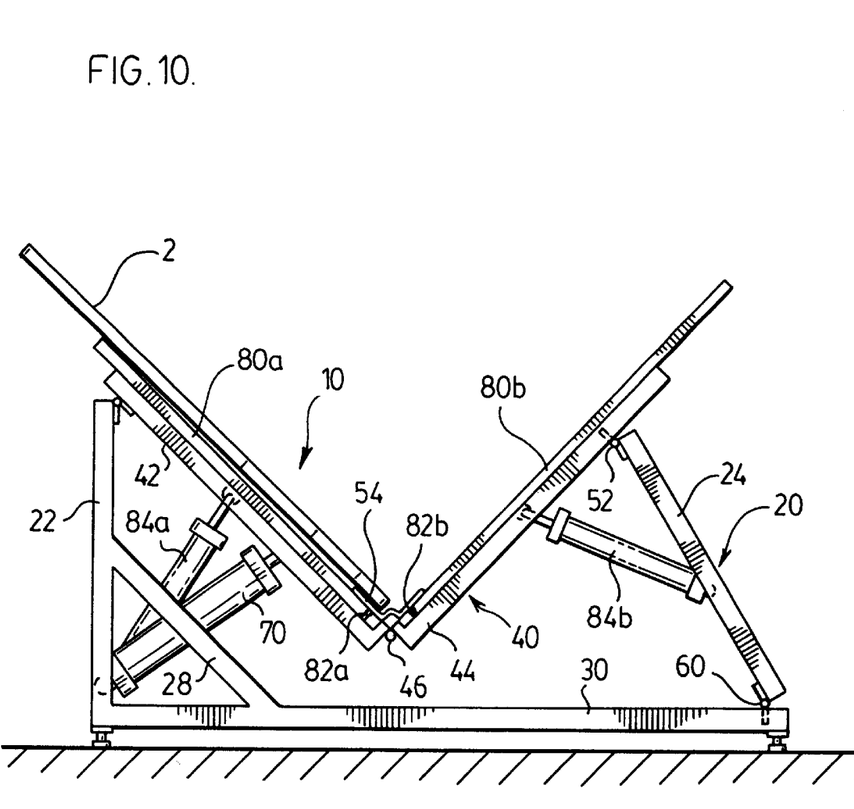
FIG. 10 is a front elevation of the embodiment of FIG. 7 showing the top frame in the collapsed condition after inversion of the workpiece,.

In the operation of the embodiment of FIGS. 7 to 10, once the top frame 40 has been fully collapsed in the manner described above in relation to the embodiment shown in FIG. 1, the cylinder 84*a* is actuated to raise the receiving frame 80*a* to a position just before the vertical (shown by the dotted line in FIG. 8), and immediately thereafter, or at substantially the same time, the cylinder 84*b* is actuated to raise the delivering frame 80*b* to a position just past the vertical, as shown in FIG. 9. The delivering frame 80*b* thus raises the workpiece 2 slightly past the vertical and delivers it to the receiving frame 80*a*. Both cylinders 84*a*, 84*b* are retracted to lower the respective receiving and delivering frames 80*a*, 80*b* back down to the top frame sections 42, 44, as shown in FIG. 10, at which point the workpiece 2 has been inverted. The top frame 40 is returned to the horizontal position in the same manner described above in relation to the embodiment of FIG. 1 by the actuator 70 (the actuators 84*a*, 84*b* are not used to return the table to the horizontal position, although the pistons 86*a*, 86*b* will extend during this process as the top frame 40 rises).

With the actuation of the cylinders 70, 84*a* and 84*b* properly timed, the embodiment of FIGS. 7 to 10 provides a fully automated workpiece inverting system which eliminates manual intervention in the inverting process. The workpiece 2 can be fed to the delivering frame 80*b* by the conveyor 8, and after inversion can be fed down the conveyor 8 for further processing.

A preferred embodiment of the invention having been thus described by way of example only, it will be apparent to those skilled in the art that certain modifications and adaptations may be made without departing from the scope of the invention, as set out in the appended claims.

I claim:

1. A work support system, comprising a supporting frame and a top frame, the top frame having a hinge at an intermediate portion of the top frame and being hinged to a first leg of the supporting frame at a first end of the supporting frame, the top frame being hinged to a second leg at a second end opposite the first end, the second leg being hinged to the supporting frame at a point below the top frame whereby at least a portion of the second leg can collapse into the supporting frame as the top frame is collapsed along the intermediate hinge, wherein the top frame can be collapsed along the intermediate hinge to lower an edge of a workpiece into the supporting frame for inversion of the workpiece about the lowered edge.

2. The work support system of claim 1 comprising an actuator for collapsing and raising the top frame.

3. The work support system of claim 2 in which the actuator comprises a pneumatic piston.

4. The work support system of claim 1 comprising a work surface affixed to the top frame.

5. The work support system of claim 4 in which the work surface comprises a delivering frame and a receiving frame each respectively hingedly affixed to the top frame on opposite sides of the hinge at the intermediate portion of the top frame, wherein the delivering frame and the receiving frame can be pivoted away from the top frame to raise and lower the workpiece.

6. The work support system of claim 5 in which the receiving frame can be pivoted to a position just before a vertical position and the delivering frame can be pivoted to a position just past the vertical position to deliver the workpiece to the receiving frame.

7. The work support system of claim 5 in which the delivering frame and the receiving frame are pivoted by respective actuators anchored to the supporting frame.

8. The work support system of claim 7 in which the actuators comprise pneumatic cylinders.

9. The work support system of claim 1 comprising a flexible member affixed to the top frame and overlying the hinge to protect the workpiece.

10. The work support system of claim 9 in which the flexible member curls when the top frame is collapses, forming a cushion for supporting the lowered edge of the workpiece.

11. The apparatus of claim 1 wherein the top frame is supported in a substantially planar condition.

12. A method of inverting a workpiece supported on a work support comprising a supporting frame having legs for supporting a top frame, the top frame having a hinge at an intermediate portion of the top frame and being hinged to the supporting frame at a first end of the supporting frame, the supporting frame having a hinge at a second end opposite the first end of the supporting frame whereby at least a portion of each leg at the opposite end can collapse into the supporting frame, comprising the steps of a. with the top frame supported in raised condition, positioning the workpiece on one side of the intermediate hinge, b. collapsing the top frame along the intermediate hinge to lower an edge of a workpiece into the supporting frame, c. toggling the workpiece about the lowered edge to the other side of the intermediate hinge, and d. raising the top frame to the raised condition.

13. The method of claim 12 in which a receiving frame and a delivering frame are respectively hingedly affixed to the top frame on opposite sides of the hinge at the intermediate portion of the top frame, wherein step c. comprises the substeps of:

i. pivoting the receiving frame away from the top frame to a position just before a vertical position, ii. pivoting the delivering frame away from the top frame to a position just past the vertical position, to deliver the workpiece to the receiving frame, and iii. pivoting the receiving frame back to the top frame.

14. The method of claim 13 comprising the step of delivering the workpiece to the delivering frame using a conveyor.

15. The method of claim 12 including, in step b., the step of collapsing at least a portion of a leg at one end of the supporting frame into the supporting frame.

16. The method of claim 12 wherein in step d. the top frame is raised to a substantially planar condition.

* * * * *